(12) United States Patent
Lickfelt

(10) Patent No.: US 10,482,699 B1
(45) Date of Patent: Nov. 19, 2019

(54) SYSTEM AND METHOD FOR COMMUNICATING WITH A PORTABLE DEVICE IN AN ELECTRICALLY NOISY ENVIRONMENT

(71) Applicant: Honda Motor Co., Ltd., Tokyo (JP)

(72) Inventor: Brian K. Lickfelt, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/055,289

(22) Filed: Aug. 6, 2018

(51) Int. Cl.
    *G07C 9/00* (2006.01)
    *H04W 4/48* (2018.01)
    *H04W 4/02* (2018.01)

(52) U.S. Cl.
    CPC ....... *G07C 9/00309* (2013.01); *H04W 4/02* (2013.01); *H04W 4/48* (2018.02); *G07C 2009/0042* (2013.01); *G07C 2009/00357* (2013.01); *G07C 2009/00769* (2013.01); *G07C 2209/63* (2013.01)

(58) Field of Classification Search
    CPC .............................. G07C 9/00309; H04W 4/02
    USPC ........................................................ 340/5.61
    See application file for complete search history.

(56) References Cited

U.S. PATENT DOCUMENTS

| | | |
|---|---|---|
| 7,672,674 B2 | 3/2010 | Mahany |
| 8,160,496 B2 | 4/2012 | Satou |
| 8,253,559 B2 | 8/2012 | Howard et al. |
| 8,810,392 B1 | 8/2014 | Teller et al. |
| 9,301,337 B2 | 3/2016 | Brown et al. |
| 9,380,540 B1 | 6/2016 | Hermann et al. |
| 9,405,944 B2 | 8/2016 | Van Wiemeersch et al. |
| 9,489,821 B2 | 11/2016 | King et al. |
| 9,685,014 B1 | 6/2017 | Ghabra |
| 9,747,736 B2 | 8/2017 | Austen et al. |
| 9,794,753 B1 | 10/2017 | Stitt et al. |
| 9,807,704 B2 | 10/2017 | Hermann et al. |
| 2004/0130457 A1* | 7/2004 | Ueda ............... B60R 25/24 340/5.72 |
| 2006/0114100 A1* | 6/2006 | Ghabra ............ E05B 81/78 340/5.61 |
| 2006/0202798 A1 | 9/2006 | Baumgartner et al. |
| 2008/0174446 A1 | 7/2008 | Ghabra et al. |
| 2011/0102146 A1 | 5/2011 | Giron |
| 2013/0135095 A1 | 5/2013 | Stochita |
| 2015/0116079 A1 | 4/2015 | Mishra et al. |
| 2015/0296348 A1 | 10/2015 | Ghabra |
| 2016/0125722 A1* | 5/2016 | Ueki ............... B60R 25/245 340/8.1 |
| 2017/0008488 A1 | 1/2017 | Matsumoto et al. |
| 2017/0158168 A1 | 6/2017 | Nantz et al. |
| 2017/0180934 A1 | 6/2017 | Brice et al. |

(Continued)

*Primary Examiner* — Vernal U Brown
(74) *Attorney, Agent, or Firm* — Rankin, Hill & Clark LLP

(57) ABSTRACT

A system and method for communicating with a portable device that include sending a predetermined number of LF polling signals from a vehicle to reach an entirety of a predetermined proximity of the vehicle. The system and method also include determining if at least one of the LF polling signals is received by the portable device located within the predetermined proximity of the vehicle. The system and method further include sending a wireless communication signal from the vehicle to reach the entirety of the predetermined proximity of the vehicle upon determining that the at least one of the LF polling signals is not received by the portable device.

20 Claims, 5 Drawing Sheets

(56) References Cited

U.S. PATENT DOCUMENTS

2017/0303080 A1  10/2017  Stitt et al.
2017/0323504 A1  11/2017  Austen et al.
2018/0103414 A1* 4/2018  Golsch .................... B60R 25/24

* cited by examiner

SYSTEM AND METHOD FOR COMMUNICATING WITH A PORTABLE DEVICE IN AN ELECTRICALLY NOISY ENVIRONMENT

BACKGROUND

Today vehicle systems may allow features to be enabled or disabled based on a determination of a portable device (e.g., key fob) being located within a predetermined proximity of a vehicle. Many of these systems require an individual to perform some type of action to instruct the systems that the portable device is within the predetermined proximity of the vehicle to enable or disable particular features of the vehicle. For example, some systems require individuals to input specific buttons on a key fob in a specific manner in order to instruct the systems to actuate powered unlocking or locking of the vehicle doors.

It may be determined that the portable device is in proximity of the vehicle based on signals that are exchanged between the vehicle and the portable device. It is a common occurrence that such signals between the vehicle and the portable device may be interrupted in an electronically noisy environment thereby precluding the enablement or disablement of one or more features as an individual holding the portable device walks towards or away from the vehicle. In particular, an electronically noisy environment may preclude the portable device from receiving LF signals from the vehicle and/or may preclude the vehicle from receiving LF signals from the portable device. This may lead to an inconvenient situation where a user may have to remove an interfering device (e.g., mobile phone) that causes interference of LF communication or move the portable device away from the interfering device to allow the features of the vehicle to be enabled or disabled based on the proximity of the portable device to the vehicle.

BRIEF DESCRIPTION

According to one aspect, a computer-implemented method for communicating with a portable device in an electrically noisy environment that includes sending a predetermined number of LF polling signals from a vehicle to reach an entirety of a predetermined proximity of the vehicle. The computer-implemented method also includes determining if at least one of the LF polling signals is received by the portable device located within the predetermined proximity of the vehicle. The computer-implemented method further includes sending a wireless communication signal from the vehicle to reach the entirety of the predetermined proximity of the vehicle upon determining that the at least one of the LF polling signals is not received by the portable device.

According to another aspect, a system for communicating with a portable device in an electrically noisy environment that includes a memory storing instructions when executed by a processor cause the processor to send a predetermined number of LF polling signals from a vehicle to reach an entirety of a predetermined proximity of the vehicle. The instructions also cause the processor to determine if at least one of the LF polling signals is received by the portable device located within the predetermined proximity of the vehicle. The instructions further cause the processor to send a wireless communication signal from the vehicle to reach the entirety of the predetermined proximity of the vehicle upon determining that the at least one of the LF polling signals is not received by the portable device.

According to still another aspect, a computer readable storage medium storing instructions that when executed by a computer, which includes at least a processor, causes the computer to perform a method that includes sending a predetermined number of LF polling signals from a vehicle to reach an entirety of a predetermined proximity of the vehicle. The instructions also include determining if at least one of the LF polling signals is received by a portable device located within the predetermined proximity of the vehicle. The instructions further include sending a wireless communication signal from the vehicle to reach the entirety of the predetermined proximity of the vehicle upon determining that the at least one of the LF polling signals is not received by the portable device.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
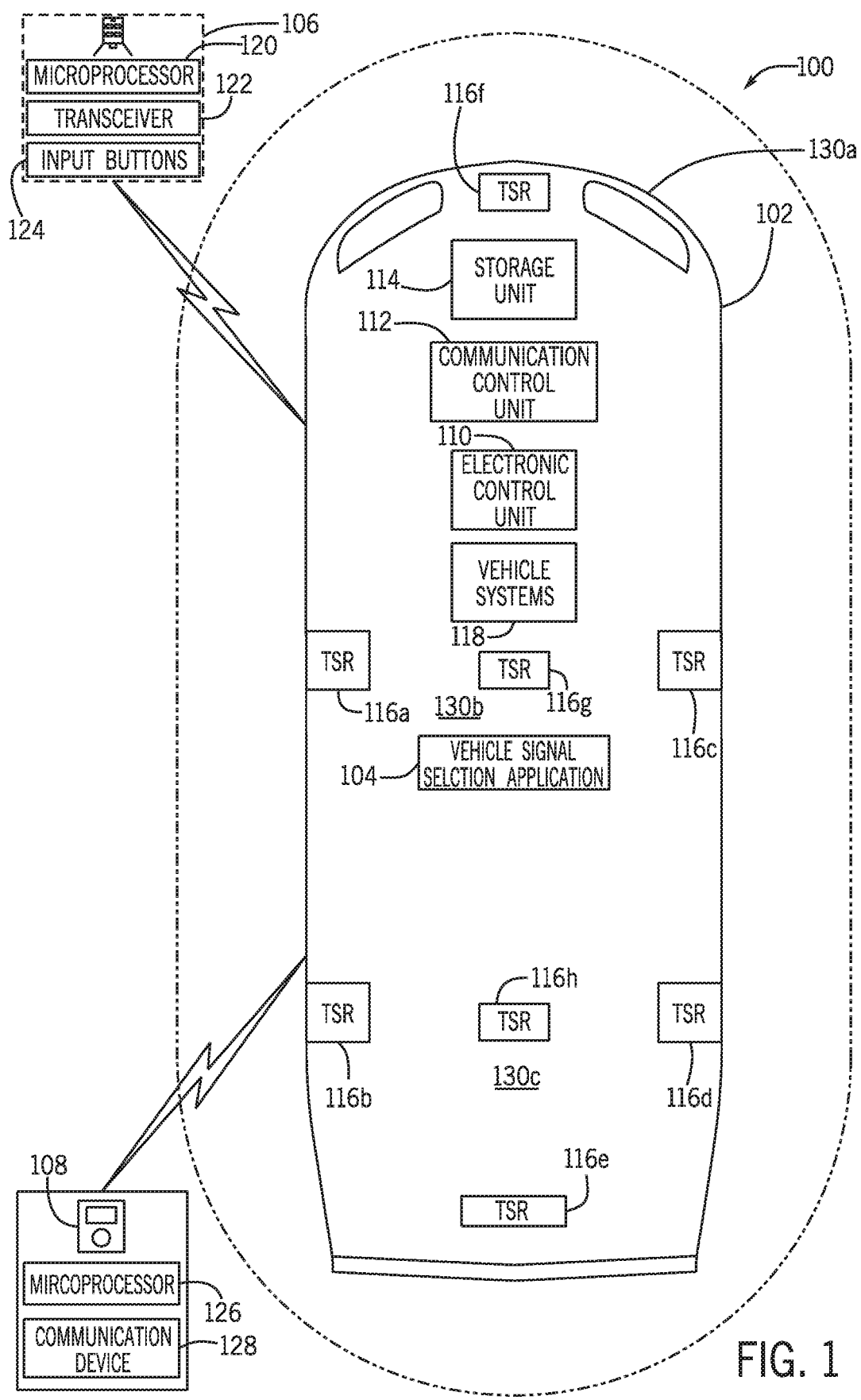
FIG. 1 is a schematic view of an exemplary operating environment of a vehicle signal selection system 100 within a vehicle 102 for communicating with a portable device 106 is an electronically noisy environment according to an exemplary embodiment.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), a Bluetooth®® communication system, a radio frequency communication system (e.g., LF radio frequency), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 shows a schematic view of an exemplary operating environment of a vehicle signal selection system 100 within a vehicle 102 for communicating with a portable device 106 in an electronically noisy environment according to an exemplary embodiment. The system 100 includes components that are utilized to determine if the portable device 106 is located within a predetermined proximity (e.g., predetermined distance) of the vehicle 102 (as designated in the exemplary embodiment of FIG. 1 by the area encompassed between the vehicle 102 and the dashed lines). The components of the system 100, as well as the components of other systems, hardware architectures and software architectures discussed herein, may be combined, omitted or organized into different architecture for various embodiments. However, the exemplary embodiments discussed herein focus on the environment as illustrated in FIG. 1, with corresponding system components, and related methods.

In an exemplary embodiment, the system 100 may include a vehicle signal selection application 104 (signal selection application). The signal selection application 104 may be executed to determine if the portable device 106 is located within the predetermined proximity of the vehicle 102 to enable or disable one or more functions of one or more vehicle systems 118. As discussed below, the signal selection application 104 may ensure that communication is established with the portable device 106 in an electrically noisy environment to determine if the portable device 106 is within the predetermined proximity of the vehicle 102.

In particular, electrical noise within the electronically noisy environment may be brought on by the utilization of one or more mobile devices 108 that may be located within a particular proximity (e.g., close proximity) of the portable device 106. For example, electronic signals being transmitted and/or received by the one or more mobile devices 108 may cause radio frequency noise that interferes with the communication of LF signals that may include but may not be limited to LF polling signals and LF response signals between the vehicle 102 and the portable device 106.

As discussed below, the signal selection application 104 may utilize components of the vehicle 102, the portable device 106, and/or the mobile device(s) 108 to ensure that the electronically noisy environment does not preclude the determination as to the location of the portable device 106 and/or the mobile device(s) 108 with respect to the predetermined proximity of the vehicle 102. In particular, as discussed below, the application 104 may enable the vehicle 102 to send one or more types of signals (e.g., LF polling signals, wireless communication signals) to the portable device 106 in one or more types of frequencies and/or more types of wireless communication formats (e.g., wireless communication mediums) to ensure that the signal(s) may be received by the portable device 106 to overcome interference caused by electrical noise attributed to one or more mobile devices 108 that are located within a particular proximity of the portable device 106.

As discussed in more detail below, upon the receipt of the signal (e.g., that may include an LF polling signal or a wireless communication signal) by the portable device 106, the application 104 may also enable the portable device 106 to send one or more types of response signals to the vehicle 102 in one or more types of frequencies and/or one or more types of wireless communication formats to ensure that the response signal(s) may be received by the vehicle 102. Upon reception of the response signal(s) by the vehicle 102, one or more of the vehicle systems 118 may enable or disable one or more functions that may be respectively provided.

With particular reference to the vehicle 102, in one embodiment, the vehicle 102 may include an electronic control unit 110 (ECU). The ECU 110 may operably control the vehicle 102 and its components that may include, but are not limited to the components shown in FIG. 1. The ECU 110 may include a microprocessor, one or more application-specific integrated circuit(s) (ASICs), or other similar devices. The ECU 110 may also include internal processing memory, an interface circuit, and bus lines for transferring data, sending commands, and communicating with the systems and components of the vehicle 102.

The ECU 110 may also include a separate communications device (not shown) for sending data internally in the vehicle 102. In one embodiment, the ECU 110 may operably communicate with a head unit (not shown) of the vehicle 102. The ECU 110 and/or the head unit may send one or more command signals to one or more of the vehicle systems 118 to enable or disable one or more features of the vehicle system(s) 118.

In one or more embodiments, the ECU 110 may also be operably connected to a communication control unit 112, a storage unit 114, and the transceivers 116a-116h. The communication control unit 112 of the vehicle 102 may be operably connected to the transceivers 116a-116h. The communication control unit 112 may utilize the transceivers 116a-116h to send and receive communication signals (e.g., low frequency (LF) polling signals/LF response signals, other RF signals, Bluetooth® signals, Wi-Fi signals, ZigBee signals, WiMax signals etc.) to and from the portable device 106 and/or the mobile device(s) 108 and the vehicle 102.

In particular, the communication control unit 112 may be configured to control operation of the one or more transceivers 116a-116h to send one or more communication signals to the portable device 106 in one or more frequencies and/or in one or more wireless communication formats. Additionally, the communication control unit 112 may be configured to control operation of the one or more transceivers 116a-116h to receive one or more communication response signals in one or more frequencies and/or in one or more wireless communication formats from the portable device 106. Additionally, the communication control unit 112 may be configured to control operation of the transceivers 116a-116h to send and/or receive data signals to/from the one or more mobile devices 108. As discussed below, in some embodiments, such data signals may be electrically analyzed to add one or more respective mobile devices 108 to an interfering device data list (data file, not shown) that may be stored on the storage unit 114 of the vehicle 102.

In an exemplary embodiment, the communication control unit 112 of the vehicle 102 may utilize the transceivers 116a-116h to communicate with the portable device 106 by transmitting/receiving RF and LF communication signals. In addition, the communication control unit 112 may utilize the transceivers 116a-116h and/or additional/alternate components of the vehicle 102 to communicate with the portable device 106 and/or the mobile device(s) 108 through alternate wireless communication frequencies and/or formats, including, but not limited to, Bluetooth®, Wi-Fi, and/or similar wireless communication methods.

In one embodiment, the communication control unit 112 may send one or more commands to the transceivers 116a-116h to send one or more types of signals at one or more signal strengths and at one or more frequencies and/or formats based on one or more commands received by the communication control unit 112 from the signal selection application 104 and/or the ECU 110. Additionally, the communication control unit 112 may send one or more commands to the transceiver(s) 116a-116h to send one or more types of signals at one or more signal strengths and at one or more frequencies based on one or more amounts of power supplied to the transceivers(s) 116a-116h, as may be determined by the signal selection application 104 and/or the ECU 110.

In an exemplary embodiment, the transceivers 116a-116h may be capable of providing wireless computer communications utilizing various protocols to be used to send/receive electronic signals internally to components and systems within the vehicle 102 and to external devices including the portable device 106 and/or the one or more mobile devices 108. The transceivers 116a-116h may include respective transmitter antennas (not shown) and receiver antennas (not shown) that may be separate components or may be configured as a single component.

The transceivers 116a-116h may be included at one or more areas of the vehicle 102 that may be utilized to determine a location of the portable device 106 within the predetermined proximity of the vehicle 102. For example, as shown in FIG. 1, the transceivers 116a-116h may be provided within a vicinity of a front portion 130a (e.g., hood) of the vehicle 102, at a middle portion 130b of the vehicle 102, and at a rear portion 130c (e.g., trunk) of the vehicle 102 to send and receive signals from various areas around the vehicle 102.

In one or more embodiments, the transceivers 116a-116h may be operably controlled to transmit one or more signals to the predetermined proximity of the vehicle 102 (e.g., areas within a predetermined distance around the vehicle 102) at one or more frequencies and/or formats to the portable device 106. As discussed below, the one or more transceivers 116a-116h may also be operably controlled to transmit one or more signals to the predetermined proximity of the vehicle 102 to the one or more mobile devices 108.

As discussed below, the signal selection application 104 may communicate commands to the communication control unit 112 to send one or more LF polling signals from the vehicle 102 to an area that includes the predetermined proximity of the vehicle 102 through the transceivers 116a-116h. Additionally, the signal selection application 104 may utilize the communication control unit 112 to determine if one or more response signals is received from the portable device 106.

In one or more embodiments, when it is determined that the response signals is not received, possibly due to electrical interference caused by one or more of the mobile devices 108, the application 104 may utilize the communication control unit 112 to send one or more wireless communication signals to the portable device 106 in one or more alternative frequencies and/or formats than the LF polling signal(s). For example, the communication control unit 112 may be configured to operably control the transceivers 116a-116h to send the one or more wireless communication signals in a Bluetooth®, UWB, Wi-Fi, or other wireless frequencies and/or formats to ensure that the communication of the wireless signal(s) is successfully received by the portable device 106 in spite of the electrical noise (precluding the reception of the LF polling signal(s)).

In one embodiment, the storage unit 114 of the vehicle 102 may include various memories such as, for example L1, L2, or L3 cache or system memory. As such, the memory may include static random access memory (SRAM), dynamic RAM (DRAM), flash memory, read only memory (ROM), or other similar memory devices. The storage unit 114 may be utilized to store one or more operating systems, applications, associated operating system data, application data, vehicle system and subsystem user interface data, and the like that may be executed by the ECU 110.

As discussed below, in some embodiments, data signals may be communicated by one or more of the mobile devices 108 and may be electronically analyzed to add device identification codes associated with one or more respective mobile devices 108 to the interfering device data list that may be stored on the storage unit 114 of the vehicle 102. The interfering device data list may be accessed and evaluated by the application 104 to determine if one or more of the mobile devices 108 that are included within the list are located within the predetermined proximity of the vehicle 102 to determine the existence of one or more (known) interfering devices that may potentially preclude LF communications between the vehicle 102 and the portable device 106. This evaluation may enable the application 104 to use the communication control unit 112 to send one or more wireless communication signals to the portable device 106 and/or the mobile device(s) 108 in one or more frequencies and/or formats that are an alternate format to the LF polling signal(s).

With particular reference to the portable device 106, the portable device 106 may include, but is not limited to, an electronic key fob, a smart key, a remote control, and the like. In one embodiment, the portable device 106 may include a microprocessor 120 that is utilized to operably control components of the portable device 106. The microprocessor 120 may include memory, an interface circuit, and bus lines, for transferring data, sending commands, communicating with the various components and controlling an overall operation of the portable device 106. In one embodiment, the microprocessor 120 may store a device identification code that specifically corresponds to the portable device 106 to be used as an identification mechanism by the vehicle 102.

The portable device 106 may also include a transceiver 122 that may send and receive electronic signals to and/or from the vehicle 102. In particular, the transceiver 122 may receive LF polling signals and/or wireless communication signals that are communicated by the one or more transceivers 116a-116h of the vehicle 102 when the portable device 106 is located within the predetermined proximity of the vehicle 102. The transceiver 122 may be configured to include components (e.g., antennas) that communicate using one or more wireless communication protocols.

In particular the portable device 106 may be configured to receive electronic signals including, but not limited to, LF polling signals and/or wireless communication signals sent from the vehicle 102 in one or more frequencies and/or formats. The transceiver 122 is configured to receive LF polling signals and/or wireless communication signals via wireless communication protocols that may include, but may not be limited to, Bluetooth® communications, Wi-Fi communications, ZigBee communications, WiMax communications, and the like. For example, the transceiver 122 may be configured to receive LF polling signals and Bluetooth® wireless communication signals sent by the communication control unit 112 of the vehicle 102 through the one or more transceivers 116a-116h.

Upon receipt of the LF polling signals and/or wireless communication signals communicated by the transceiver(s) 116a-116h of the vehicle 102, the transceiver 122 may communicate one or more response signals back to the one or more transceivers 116a-116h of the vehicle 102. In particular, the transceiver 122 may communicate (e.g., transmit) response signals that are communicated to the one or more transceivers 116a-116h of the vehicle 102 when the portable device 106 is located within the predetermined proximity of the vehicle 102. The transceiver 122 may be configured to communicate using one or more wireless communication protocols.

In particular the portable device 106 may be configured to communicate electronic signals including, but not limited to, response signals to the vehicle 102 in one or more frequencies and/or formats. The transceiver 122 is configured to send LF response signals and/or wireless communication response signals via wireless communication protocols that may include, but may not be limited to, Bluetooth® communication signals, Wi-Fi communication signals, ZigBee communication signals, WiMAX communication signals, and the like. For example, the transceiver 122 may be configured to send LF response signals and Bluetooth® wireless communication response signals to the transceivers 116a-116h to be received by the communication control unit 112 of the vehicle 102.

In one embodiment, the response signal(s) may include confirmation data that informs the signal selection application 104 that the portable device 106 confirms receipt of the LF polling signal(s) or the wireless communication signal(s) sent from the vehicle 102. The response signal(s) may additionally include the device identification code that specifically corresponds to the portable device 106 that may be used as an identification mechanism by the vehicle 102.

Several functions of the vehicle 102 may be controlled by user input that is provided through the input buttons 124 of the portable device 106 that influence and/or command the ECU 110 and/or the signal selection application 104 to control the components of the vehicle 102 based on wireless computer communication between the portable device 106 and the transceiver(s) 116a-116h of the vehicle 102. The input buttons 124 may include, but are not limited to, door lock buttons, door unlock buttons, door open/close start/stop button (individual buttons not shown). In one embodiment, input of one or more of the input buttons 124 may be utilized to start or stop the sending of one or more LF polling signals and/or one or more wireless communication signals by the vehicle 102 to the portable device 106.

In an exemplary embodiment, the one or more mobile devices 108 may include, but may not be limited to, alternate electronic key fobs (e.g., that are associated to other vehicles), smart phones, tablets, laptops, remote controls, and the like that may be in a particular (close) proximity to the portable device 106. For example, a user carrying the portable device 106 in a pocket or purse may also carry one or more of the mobile devices 108 in the pocket or purse. As discussed, the one or more mobile devices 108 may send and/or receive electronic signals to/from the vehicle 102 and/or additional wireless components, systems, and infrastructure (not shown) and may consequently cause radio frequency noise that interferes with the communication of LF signals between the vehicle 102 and the portable device 106.

In an exemplary embodiment, the one or more mobile devices 108 may include a respective microprocessor 126 that is utilized to operably control components of the respective mobile device(s) 108. The microprocessor 126 may include memory, an interface circuit, and bus lines, for transferring data, sending commands, communicating with the various components and controlling an overall operation of the respective mobile device(s). In one embodiment, the microprocessor 126 may store a specific identification code that specifically corresponds to the respective mobile device(s) 108 be used as an identification mechanism by the vehicle 102.

The mobile device(s) 108 may also include a communication device 128 that may be operably connected to one or more antennas (not shown). The communication device 128 may be configured to send and receive electronic signals to and/or from the vehicle 102. In particular, the communication device 128 may be configured to send and receive LF signals, RF signals, Bluetooth® communications, Wi-Fi communications, ZigBee communications, WiMax communications, and the like.

The mobile device(s) 108 may be configured to receive electronic signals including, but not limited to, LF polling signals and/or wireless communication signals sent from the vehicle 102 in one or more frequencies and/or formats. The transceiver 122 is configured to send and receive LF polling signals, Bluetooth® wireless communication signals, Wi-Fi wireless communication signals, ZigBee wireless communication signals, WiMax wireless communication signals, and the like. For example, the communication device 128 may be configured to receive Bluetooth® wireless communication signals sent by the communication control unit 112 of the vehicle 102 through the one or more transceivers 116a-116h. Additionally, the communication device 128 may be configured to send Bluetooth® wireless communication response signals to the communication control unit 112 of the vehicle 102.

II. The Vehicle Signal Selection Application and Related Methods

The components of the signal selection application 104 will now be described according to an exemplary embodiment and with reference to FIG. 1. In an exemplary embodiment, the signal selection application 104 may be stored on the storage unit 114 of the vehicle 102 and executed by the ECU 110 and/or the head unit. In additional embodiments, the signal selection application 104 may be stored on an external server infrastructure and may be accessed by the communication control unit 112 to be executed by the ECU 110 and/or the head unit. The application 104 may also be stored on the portable device 106 and/or the one or more mobile devices 108. The application 104 may also be executed and/or accessed by the transceiver 122 of the portable device 106 to be executed by the microprocessor 120. Additionally, the application 104 may be executed and/or accessed by the respective microprocessor 126 of the one or more mobile devices 108.

In one embodiment, the user may use one or more of the mobile devices 108 to execute the application 104 in order for the mobile devices 108 to be recognized by the application 104 as one or more potential interfering devices that may be located within a particular proximity to the portable device 106 as the user carries (e.g., holds, in pocket, etc.) the portable device 106 and walks towards and/or away from the vehicle 102. In particular, the mobile device(s) 108 may execute the signal selection application 104 and may thereby utilize the communication device 128 to communicate the specific identification code associated with the respective mobile device(s) 108 to the vehicle 102.

Upon reception of the specific identification code by the vehicle 102, the signal selection application 104 may access the storage unit 114 of the vehicle 102 and may add the specific identification code to the interfering device data list to be utilized to communicate the existence of the interfering mobile device(s) 108 that may cause electronic noise that may potentially preclude LF communication between the vehicle 102 and the portable device 106.

In one embodiment, upon determining the existence of the interfering mobile device(s) 108, the signal selection application 104 may utilize one or more wireless communication frequencies and/or formats to send one or more wireless communication signals and/or wireless communication response signals as an alternate to LF polling signals and/or LF response signals to facilitate the determination of the location of the portable device 106 and/or one or more mobile devices 108 determined as interfering devices within the predetermined vicinity of the vehicle 102. This functionality may overcome the preclusion of LF communication between the vehicle 102 and the portable device 106 in order to facilitate the enablement and/or disablement of one or more features of the one or more vehicle systems 118 of the vehicle 102 (e.g., when the user carrying the portable device 106 and mobile device(s) 108 is walking towards or away from the vehicle 102).

Figure 2:
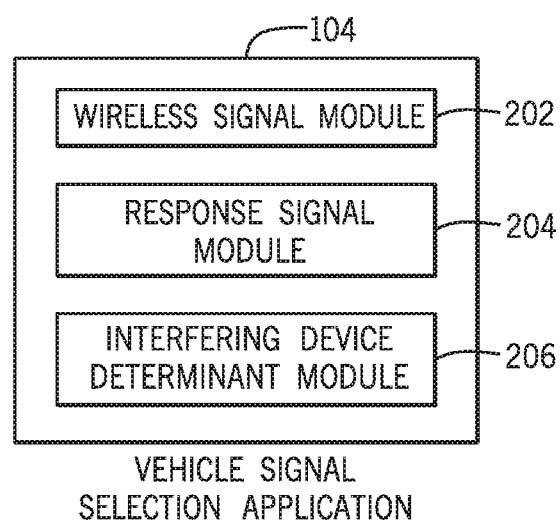
FIG. 2 is a schematic view of an exemplary operating environment of a signal selection application, according to an exemplary embodiment.

FIG. 2 illustrates a schematic view of an exemplary operating environment of the signal selection application 104, according to an exemplary embodiment. As shown in FIG. 2, in an illustrative embodiment, the signal selection application 104 may include one or more modules 202-206 that may include a wireless signal module 202, a response signal module 204, and an interfering device determinant module 206. In an exemplary embodiment, the wireless signal module 202 may be configured to communicate commands to the communication control unit 112 of the vehicle 102 to send one or more LF polling signals and/or one or more wireless communication signals to be communicated to the portable device 106 located within the predetermined proximity of the vehicle 102. In other words, the wireless signal module 202 may send commands to the communication control unit 112 to utilize the transceivers 116a-116h to send (e.g., transmit) the one or more LF polling signals and/or one or more wireless communication signals to reach an entirety of the predetermined proximity (e.g., a diameter of 35 feet) of the vehicle 102.

In particular, the wireless signal module 202 may send commands to the communication control unit 112 to send one or more LF polling signals and/or one or more wireless communication signals in one or more wireless communication frequencies and/or formats based on the potential existence of electrical noise and/or the existence of one or more mobile devices 108 determined to be interfering devices that are located within the predetermined proximity of the vehicle 102.

In some embodiments, the wireless signal module 202 may send commands to the communication control unit 112 to send the one or more LF polling signals and/or wireless communication signals directly to the communication device 128 of the mobile device(s) 108 in one or more wireless communication frequencies and/or formats based on the potential existence of electrical noise and/or the existence of one or more mobile devices 108 that are determined to be interfering devices that are located within the predetermined proximity of the vehicle 102.

In one embodiment, the response signal module 204 may communicate with the transceiver 122 of the portable device 106 through the microprocessor 120 to determine the receipt of one or more LF polling signals and/or one or more wireless communication signals sent from the communication control unit 112 of the vehicle 102. The response signal module 204 may be configured to communicate one or more commands to the transceiver 122 to send the one or more LF response signals and/or one or more wireless communication response signals in one or more wireless communication frequencies and/or formats based on the potential existence of electrical noise and/or the existence of one or more mobile devices 108 that are determined to be interfering devices that are located within the predetermined proximity of the vehicle 102.

In some embodiments, the response signal module 204 may communicate one or more commands to the respective communication device 128 of the mobile device(s) 108 to send the one or more wireless communication response signals in one or more wireless communication frequencies and/or formats based on the potential existence of electrical noise and/or the existence of one or more mobile devices 108 that are determined to be interfering devices that are located within the predetermined proximity of the vehicle 102. As discussed below, the one or more wireless communication response signals may be directly communicated to the vehicle 102 that may include, but may not be limited to, Bluetooth® wireless communication response signals, Wi-Fi wireless communication response signals, ZigBee wireless communication response signals, WiMAX wireless communication response signals, and the like.

In one or more embodiments, the interfering device determinant module 206 of the signal selection application 104 may be configured to access the storage unit 116 of the vehicle 102 to evaluate the interfering device data list. In particular, the interfering device determinant module 206 may retrieve one or more device identification codes that are associated with one or more respective mobile devices 108 that are added to the interfering device list as potential interfering devices. In one embodiment, the interfering device data list may be accessed and evaluated by the interfering device determinant module 206 to determine if one or more of the mobile devices 108 that are included within the list are located within the predetermined proximity of the vehicle 102 based on further communication with the communication control unit 112 of the vehicle 102.

In one embodiment, the interfering device determinant module 206 may communicate with the communication control unit 112 of the vehicle 102 to determine the existence of one or more mobile devices 108. As discussed below, the one or more mobile devices 108 that are used by the user and may be located within the predetermined proximity of the vehicle 102 may communicate respective identification codes that may be evaluated by the module 206 against the one or more identification codes retrieved from the interfering device data list to determine the existence of one or more interfering devices that may be located within the predetermined proximity of the vehicle 102. The determination by the interfering device determinant module 206 of the one or more interfering devices being located within the predetermined proximity of the vehicle 102 may be communicated to the wireless signal module 202 and/or the response signal module 204 to control the sending of one or more wireless communication signals and/or one or more wireless communication response signals in one or more wireless communication frequencies and/or formats (that are an alternate format to the LF polling signal(s) and/or LF response signal(s)).

Figure 3:
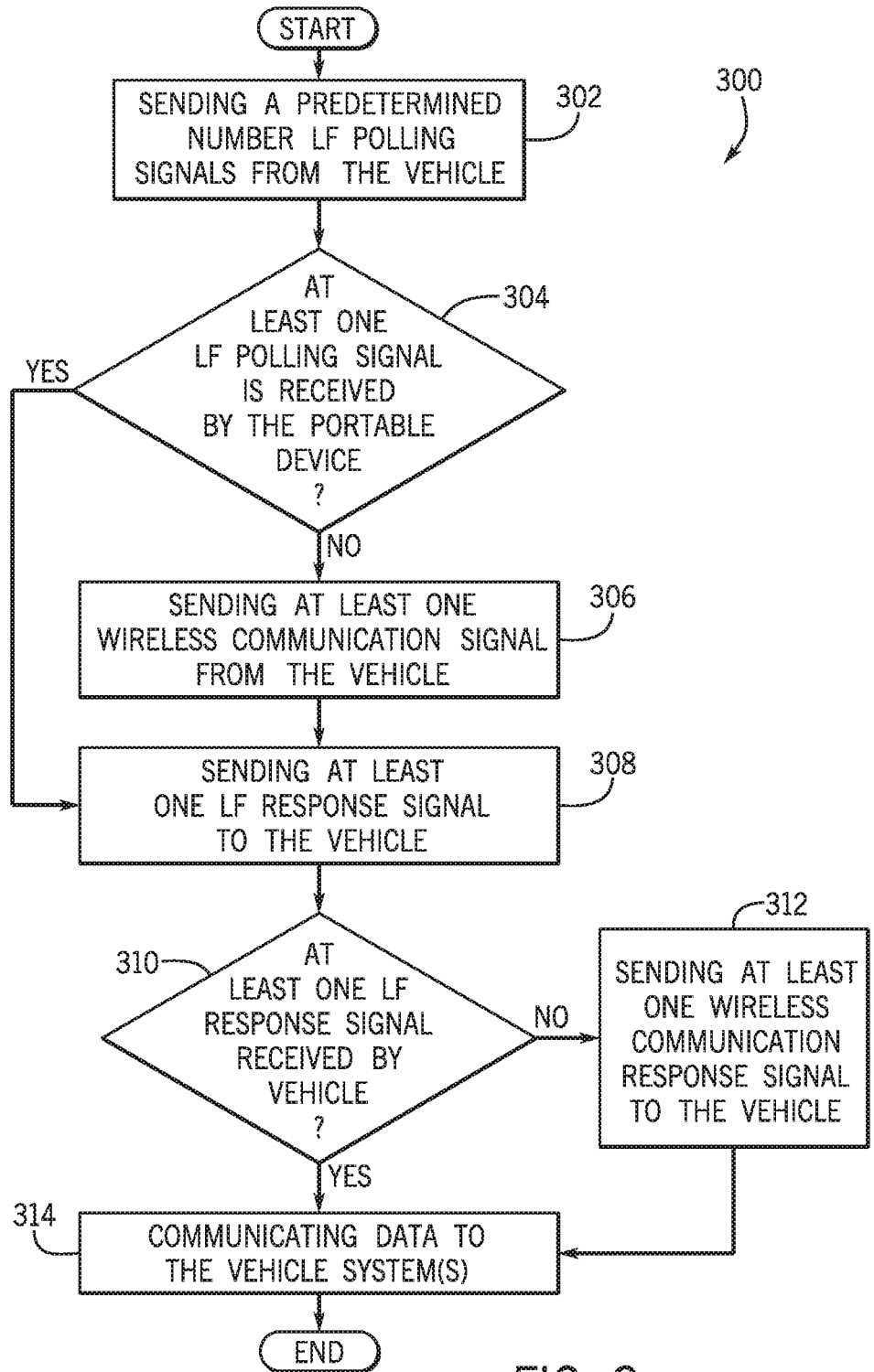
FIG. 3 is a process flow diagram of a method for selecting and sending one or more signals and one or more response signals according to an exemplary embodiment.

FIG. 3 is a process flow diagram of a method 300 for selecting and sending one or more signals and one or more response signals according to an exemplary embodiment of the present disclosure. FIG. 3 will be described with reference to the components of FIG. 1 and FIG. 2 though it is to be appreciated that the method of FIG. 3 may be used with other systems and/or components. The method 300 may begin at block 302, wherein the method 300 may include sending a predetermined number of LF polling signals from the vehicle 102.

In an exemplary embodiment, the wireless signal module 202 may communicate with the ECU 110 of the vehicle 102 to determine an ignition state of the vehicle 102. In one configuration, the ECU 110 may determine the ignition state of the vehicle 102 as an enabled or disabled state that is associated with a battery accessory (not shown) and an engine (not shown) of the vehicle 102. Upon determining the ignition state, the ECU 110 may communicate the ignition state to the wireless signal module 202. If it is determined that the ignition state of the battery accessory and/or the engine is disabled, the wireless signal module 202 may initiate the sending of the predetermined number of LF polling signals from the vehicle 102 as discussed below.

In another embodiment, the wireless signal module 202 may communicate with the communication control unit 112 of the vehicle 102 to determine if one or more of the mobile devices 108 are wirelessly connected to the vehicle 102. In particular, the mobile device(s) 108 may be wirelessly connected to the vehicle 102 (e.g., via a Bluetooth® connection), when the mobile device(s) 108 is within the predetermined vicinity of the vehicle 102. The communication control unit 112 of the vehicle 102 may communicate respective data upon determining if one or more of the mobile devices 108 are wirelessly connected to the vehicle 102 (e.g., when a user holding a particular mobile device 108 is located within the predetermined vicinity of the vehicle 102). If it is determined that one or more of the mobile devices 108 are connected to the vehicle 102, the wireless signal module 202 may initiate the sending of the predetermined number of LF polling signals from the vehicle 102, as discussed below.

In yet another embodiment, the wireless signal module 202 may communicate with the ECU 110 of the vehicle 102 to determine a door state and/or a door lock state of each door (not shown) of the vehicle 102. In one configuration, the ECU 110 may determine the door state and/or the door lock state that is associated with the opening or closing of each door of the vehicle 102 and/or the unlocking or locking of each lock (not shown) of each door of the vehicle 102. Upon determining the door state and/or the door lock state, the ECU 110 may communicate the door state and/or the door lock state to the wireless signal module 202.

If it is determined that the door state and/or the door lock state has changed, the wireless signal module 202 may initiate the sending of the predetermined number of LF polling signals from the vehicle 102 as discussed below. For example, if a user remotely locks a door of the vehicle 102 through the input buttons 124 of the portable device 106 causing the door lock state to change from the unlocked state to the locked state, the wireless signal module 202 may initiate the sending of the predetermined number of LF polling signals from the vehicle 102.

More specifically with respect to the sending of LF polling signals, the wireless signal module 202 may be configured to communicate commands to the communication control unit 112 of the vehicle 102 to send a predetermined number of LF polling signals to be potentially communicated to the portable device 106 potentially located within the predetermined proximity of the vehicle 102. In other words, the wireless signal module 202 may send commands to the communication control unit 112 to utilize the transceivers 116a-116h to send (e.g., transmit) the predetermined number of LF polling signals to reach an entirety of the predetermined proximity of the vehicle 102. The communication control unit 112 may thereafter utilize the transceivers 116a-116h to send the predetermined number of LF polling signals from the vehicle 102.

The method 300 may proceed to block 304, wherein the method 300 may include determining if at least one LF polling signal is received by the portable device 106. In an exemplary embodiment, upon sending of each of the predetermined number of LF polling signals from the vehicle 102, the wireless signal module 202 may communicate respective data to the response signal module 204 that indicates the sending of the respective LF polling signal. Upon receiving indication of the sending of each LF polling signal from the wireless signal module 202, the response signal module 204 may be configured to communicate with the transceiver 122 of the portable device 106 through the microprocessor 120 to determine if the transceiver 122 has received one or more of the predetermined number of LF polling signals sent from the communication control unit 112 of the vehicle 102.

If the transceiver 122 is within the predetermined proximity of the vehicle 102 and receives one or more of the predetermined number of LF polling signals, the transceiver 122 may communicate respective data to the response signal module 204. This may indicate that electrical noise has not precluded LF communication between the vehicle 102 and the portable device 106. Alternatively, if the transceiver 122 does not receive one or more of the predetermined number of the LF polling signals, the transceiver 122 may communicate respective data to the response signal module 204. This may indicate that the location of the portable device 106 outside of the predetermined proximity of the vehicle 102 and/or electrical noise caused by one or more of the mobile devices 108 may be precluding the LF communication between the vehicle 102 and the portable device 106.

If it is determined that at least one LF polling signal is not received by the portable device 106 (at block 304), the method 300 may proceed to block 306, wherein the method 300 may include sending a wireless communication signal from the vehicle 102. In an exemplary embodiment, if the wireless signal module 202 determines that one or more of the LF polling signals has not been received by the transceiver 122 of the portable device 106 based on the respective communication from the response signal module 204, the wireless signal module 202 may communicate commands to the communication control unit 112 to send one or more wireless communication signals from the vehicle 102 to the entirety of the predetermined proximity of the vehicle 102.

In particular, the wireless signal module 202 may send commands to the communication control unit 112 to send one or more wireless communication signals in one or more wireless communication frequencies and/or formats based on the potential existence of electrical noise. In one configuration, upon receiving the commands, the communication control unit 112 may utilize the transceivers 116a-116h to send one or more number of wireless communication signals from the vehicle 102 to the entirety of the predetermined proximity of the vehicle 102. The transceivers 116a-116h may send the one or more wireless communication signals that may include, but may not be limited to, Bluetooth® wireless communication signals, Wi-Fi wireless communication signals, ZigBee wireless communication signals, WiMAX wireless communication signals, and the like.

If it is determined that at least one LF polling signal is received by the portable device 106 (at block 304), or the wireless signal module 202 sends at least one wireless communication signal from the vehicle 102 (at block 308), the method 300 may proceed to block 308, wherein the method 300 may include sending at least one LF response signal to the vehicle 102. As discussed above, the transceiver 122 of the portable device 106 may be configured to include components (e.g., antennas) that communicate using one or more wireless communication protocols. In particular, the transceiver 122 may be configured to receive the LF polling signal(s) or the wireless communication signal(s) sent from the vehicle 102 in one or more frequencies and/or formats.

Upon receipt of the LF polling signal(s) or the wireless communication signal(s) sent from the vehicle 102, the transceiver 122 may communicate respective data to the response signal module 204. The response signal module 204 may be configured to thereafter communicate one or more commands to the transceiver 122 to send the one or more LF response signals back to the vehicle 102. The one or more LF response signals may be sent back to the vehicle 102 to indicate to the application 104 and the vehicle 102 that the portable device 106 is within the predetermined vicinity of the vehicle 102.

The method 300 may proceed to block 310, wherein the method 300 may include determining if at least one LF response signal is received by the portable device 106. In an exemplary embodiment, upon sending of each of the one or more LF response signals from the portable device 106 to the vehicle 102, the response signal module 204 may communicate respective data to the wireless signal module 202 that indicates the sending of the respective LF response signal. Upon receiving indication of the sending of each LF response signal from the response signal module 204, the wireless signal module 202 may be configured to communicate with the communication control unit 112 to determine if one or more of the transceivers 116a-116h has received one or more of the LF response signals sent from the transceiver 122 of the portable device 106.

If the portable device 106 is within the predetermined proximity of the vehicle 102 and the vehicle 102 receives one or more of the LF response signals sent from the portable device 106, the communication control unit 112 may communicate respective data to the wireless signal module 202. This may indicate that electrical noise has not precluded LF communication between the portable device 106 and the vehicle 102. Alternatively, if the communication control unit 112 does not receive one or more of the LF response signals, the communication control unit 112 may communicate respective data to the wireless signal module 202. This may indicate that the location of the portable device 106 is outside of the predetermined proximity of the vehicle 102 and/or electrical noise caused by one or more of the mobile devices 108 may be precluding the LF communication between the portable device 106 and the vehicle 102.

If it is determined that the at least one LF response signal is not received by the vehicle 102 (at block 310), the method 300 may proceed to block 312, wherein the method 300 may include sending at least one wireless communication response signal to the vehicle 102. In an exemplary embodiment, if the response signal module 204 determines that one or more of the LF response signals has not been received by the communication control unit 112 of the vehicle 102 based on the respective communication from the response signal module 204, the response signal module 204 may communicate commands to the transceiver 122 to send one or more wireless communication response signals from the portable device 106.

In particular, the response signal module 204 may send commands to the transceiver 122 to send the one or more wireless communication response signals in one or more wireless communication frequencies and/or formats based on the potential existence of electrical noise. In one configuration, upon receiving the commands, the transceiver 122 may send one or more number of wireless communication response signals from the portable device 106 to the entirety of the predetermined proximity of the vehicle 102. The transceivers 122 may send the one or more wireless communication response signals as wireless communication signals that may include, but may not be limited to, Bluetooth® wireless communication response signals, Wi-Fi wireless communication response signals, ZigBee wireless communication response signals, WiMAX wireless communication response signals, and the like.

If it is determined that at least one LF response signal is received by the vehicle 102 (at block 310) or a wireless communication response signal is sent to the vehicle 102 (at block 312), the method 300 may proceed to block 314, wherein the method 300 may include communicating respective data to one or more of the vehicle systems 118. In one configuration, the LF response signals and/or the wireless communication response signals may include the device identification code that specifically corresponds to the portable device 106 that may be used as an identification mechanism by the vehicle 102. In one embodiment, upon the vehicle 102 receiving the LF response signal or the wireless communication response signal, the ECU 110 may evaluate the device identification code to determine that the portable device 106 (that is associated with the vehicle 102) is located within the predetermined proximity of the vehicle 102.

In one or more embodiments, upon determining that the portable device 106 is within the predetermined proximity of the vehicle 102, the ECU 110 may communicate respective data and one or more commands to one or more of the vehicle systems 118 to enable or disable one or more functions. In other words, one or more of the vehicle systems 118 may be operably controlled to enable or disable one or more functions based on the determination that the portable device 106 is located within the predetermined proximity of the vehicle 102 as the user holding the portable device 106 is walking towards the vehicle 102 or walking away from the vehicle 102.

As an illustrative example, if the user holding the portable device 106 walks towards the vehicle 102 and is located within the predetermined proximity of the vehicle 102, the signal selection application 104 may determine that at least one LF polling signal or at least one wireless communication signal is received by the portable device 106 based on the reception of at least one LF response signal or at least one wireless communication response signal by the vehicle 102. The application 104 may communicate respective data to the ECU 110 of the vehicle 102. The ECU 110 may responsively communicate with the one or more vehicle systems 118 such as a vehicle lighting system (not shown) to enable welcome lighting within the vehicle 102 as a convenience feature as the user approaches the vehicle 102.

The utilization of one or more frequencies and/or formats based on the potential existence of electrical noise may enable the application 104 to determine the approach of the user and the portable device 106. This determination may take place in spite of a potentially electrically noisy environment that may be present based on one or more of the mobile devices 108 located within a particular (close) proximity to the portable device 106.

Figure 4:
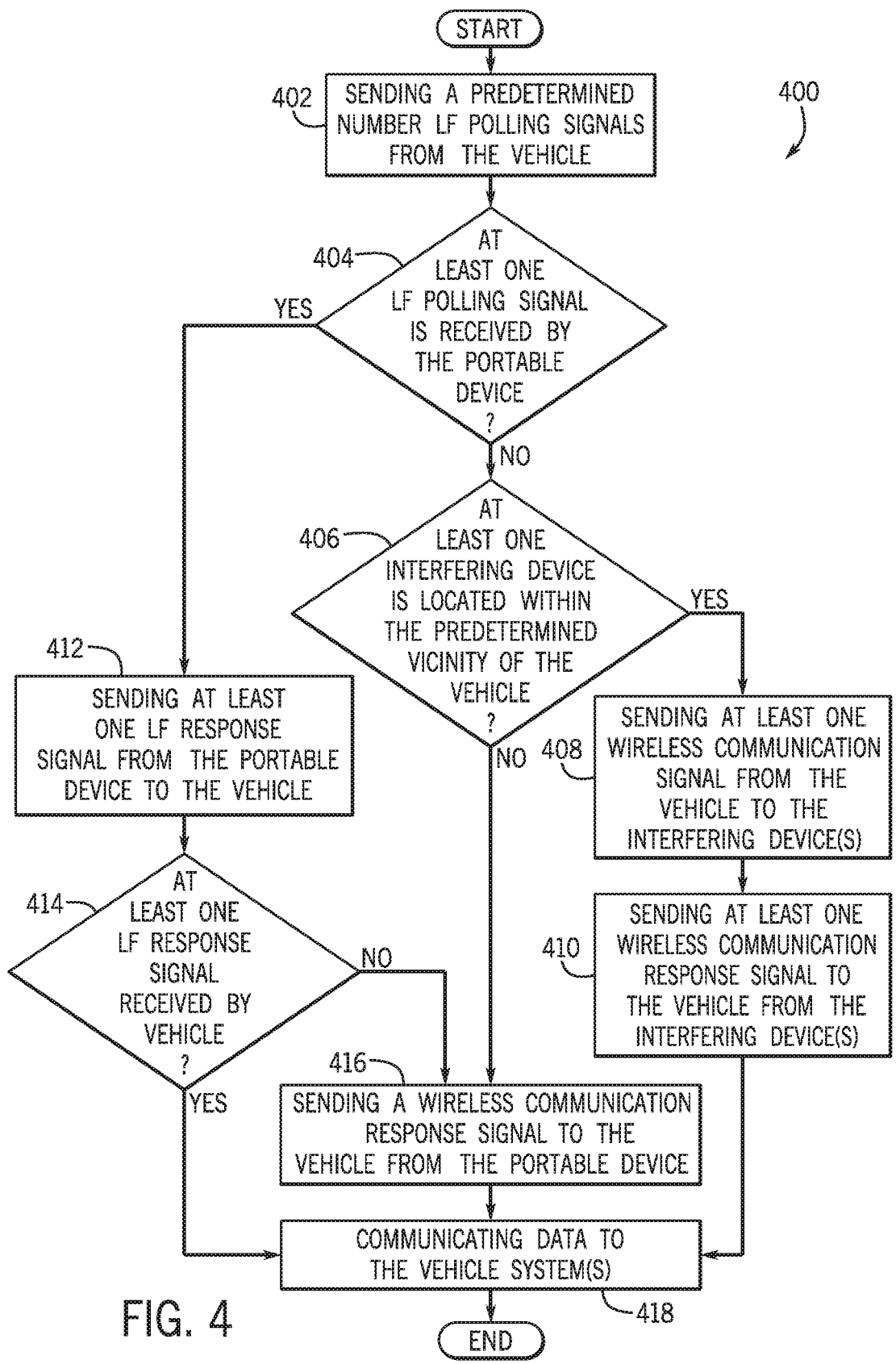
FIG. 4 is a process flow diagram of a method for determining and adding one or more interfering devices and selecting and sending one or more signals according to an exemplary embodiment of the present disclosure.

FIG. 4 is a process flow diagram of a method 400 for determining and adding one or more interfering devices and selecting and sending one or more signals according to an exemplary embodiment of the present disclosure. FIG. 4 will be described with reference to the components of FIG. 1 and FIG. 2 though it is to be appreciated that the method of FIG. 4 may be used with other systems and/or components. The method 400 may begin at block 402, wherein the method 400 may include sending a predetermined number of LF polling signals from the vehicle 102.

In an exemplary embodiment, the wireless signal module 202 may be configured to communicate commands to the communication control unit 112 of the vehicle 102 to send a predetermined number of LF polling signals to be potentially communicated to the portable device 106 located within the predetermined proximity of the vehicle 102. In other words, the wireless signal module 202 may send commands to the communication control unit 112 to utilize the transceivers 116a-116h to send (e.g., transmit) the predetermined number of LF polling signals to reach an entirety of the predetermined proximity (e.g., a radius of 15 feet) from the vehicle 102. The communication control unit 112 may thereafter utilize the transceivers 116a-116h to send the predetermined number of LF polling signals from the vehicle 102.

The method 400 may proceed to block 404, wherein the method 400 may include determining if at least one LF polling signal is received by the portable device 106. In an exemplary embodiment, upon sending of each of the predetermined number of LF polling signals from the vehicle 102, the wireless signal module 202 may communicate respective data to the response signal module 204 that indicates the sending of the respective LF polling signal. Upon receiving indication of the sending of each LF polling signal from the wireless signal module 202, the response signal module 204 may be configured to communicate with the transceiver 122 of the portable device 106 through the microprocessor 120 to determine if the transceiver 122 has received one or more of the predetermined number of LF polling signals sent from the communication control unit 112 of the vehicle 102.

If the portable device 106 and consequently the transceiver 122 is within the predetermined proximity of the vehicle 102 and receives one or more of the predetermined number of LF polling signals, the transceiver 122 may communicate respective data to the response signal module 204. This may indicate that electrical noise has not precluded LF communication between the vehicle 102 and the portable device 106. Alternatively, if the transceiver 122 does not receive one or more of the predetermined number of LF polling signals, the transceiver 122 may communicate respective data to the response signal module 204. This may indicate that the location of the portable device 106 is outside of the predetermined proximity of the vehicle 102 and/or electrical noise caused by one or more of the mobile devices 108 may be precluding the LF communication between the vehicle 102 and the portable device 106.

If it is determined that at least one LF response signal is not received by the portable device 106 (at block 404), the method 400 may proceed to block 406, wherein the method 400 may include determining if at least one interfering device is located within the predetermined vicinity of the vehicle 102. In one or more embodiments, upon determining that one or more LF polling signals are not received by the portable device 106, the response signal module 204 may communicate respective data to the interfering device determinant module 206.

Upon the receipt of the respective data indicating the non-communication of LF polling signal(s) between the vehicle 102 and the portable device 106, the interfering device determinant module 206 may be configured to access the storage unit 116 of the vehicle 102 to evaluate the interfering device data list. In particular, the interfering device determinant module 206 may retrieve one or more device identification codes that are associated with one or more respective mobile devices 108 that are executing the signal selection application 104 and have been added to the interfering device list as potential interfering devices (as discussed above).

The interfering device determinant module 206 may additionally communicate commands to the communication control unit 112 to conduct a search for one or more mobile devices 108 that may be included within the predetermined proximity of the vehicle 102 (e.g., in a particular close proximity to the portable device 106). In one embodiment, the communication control unit 112 may utilize the transceivers 116*a*-116*h* to send out a wireless pairing signal to search for one or more mobile devices 108 that may be executing the signal selection application 104 and may be located within the predetermined vicinity of the vehicle 102. For example, the communication control unit 112 may utilize the transceivers 116*a*-116*h* to send out a Bluetooth® pairing signal that allows one or more mobile devices 108 that are executing the application 104 to pair and connect to the vehicle 102.

In one embodiment, the one or more mobile devices 108 that are used by the user and may be located within the predetermined proximity of the vehicle 102 may communicate respective device identification codes based on the pairing/communication. The device identification codes may be evaluated by the module 206 against the one or more identification codes retrieved from the interfering device data list to determine the existence of one or more interfering devices that may be located within the predetermined proximity of the vehicle 102. The determination by the interfering device determinant module 206 of the one or more interfering devices being located within the predetermined proximity of the vehicle 102 may be communicated to the wireless signal module 202 and/or the response signal module 204 to control the sending of one or more wireless communication signals (from the vehicle 102) and/or one or more wireless communication response signals (from the portable device 106 or mobile device(s) 108) in one or more wireless communication frequencies and/or formats (that are an alternate format to the LF polling signal(s) or LF response signal(s)).

If it is determined that at least one interfering device is located within the predetermined proximity of the vehicle 102 (at block 406), the method 400 may proceed to block 408, wherein the method 400 may include sending at least one wireless communication signal from the vehicle 102 to the interfering device(s). In an exemplary embodiment, if the interfering device determinant module 206 determines that at least one of the mobile devices 108 that is an interfering device is located within the predetermined vicinity of the vehicle 102, the interfering device determinant module 206 may communicate respective data to the wireless signal module 202. The respective data may include the respective device identification code associated with each of the one or more mobile devices 108 that are determined to be interfering devices that are located within the predetermined vicinity of the vehicle 102.

In one configuration, the wireless signal module 202 may responsively communicate commands to the communication control unit 112 to send one or more wireless communication signals from the vehicle 102 directly to the respective communication device 128 of the mobile device(s) determined to be the interfering device(s). In one or more embodiments, the communication control unit 112 may send the one or more wireless communication signals in one or more wireless communication frequencies and/or formats directly to the communication device 128 of the one or more mobile devices 108 determined as interfering devices located within the predetermined proximity of the vehicle 102 based on the potential existence of electrical noise that may be caused by the mobile device(s) 108.

In some embodiments, the wireless communication signals may be sent in a same frequency and/or format (e.g., Bluetooth®) as the frequency and/or format of the connection of the mobile device(s) 108 to the vehicle 102 based on the pairing/communication with the vehicle 102 (completed at block 406). In one configuration, upon receiving the commands, the communication control unit 112 may utilize the transceivers 116*a*-116*h* to send one or more number of wireless communication signals from the vehicle 102 to the communication device 128 of the mobile device(s) 108. The transceivers 116*a*-116*h* may send the one or more wireless communication signals as wireless communication signals that may include, but may not be limited to, Bluetooth® wireless communication signals, Wi-Fi wireless communication signals, ZigBee wireless communication signals, WiMAX wireless communication signals, and the like.

The method 400 may proceed to block 410, wherein the method 400 may include sending at least one wireless communication response signal to the vehicle 102 from the interfering device(s). In an exemplary embodiment, if the interfering device determinant module 206 determines that at least one mobile device(s) 108 that is an interfering device is located within the predetermined vicinity of the vehicle 102, the interfering device determinant module 206 may communicate respective data to the response signal module 204. In some embodiments, the wireless communication response signals may be sent in a same frequency and/or format as the frequency and/or format of the connection of the mobile device(s) 108 to the vehicle 102 based on the on the pairing/communication with the vehicle 102 (completed at block 406).

In one or more embodiments, the response signal module 204 may send commands to the communication device 128 of the mobile device(s) 108 determined to be interfering device(s) to send the one or more wireless communication response signals in one or more wireless communication frequencies and/or formats based on the potential existence of electrical noise caused by the mobile device(s) 108. In one configuration, upon receiving the commands, the communication device 128 may send one or more number of wireless communication response signals from the mobile device(s) 108 directly to the communication control unit 112 of the vehicle 102 via the transceivers 116a-116h. The communication device 128 may send the one or more wireless communication response signals as wireless communication signals that may include, but may not be limited to, Bluetooth® wireless communication response signals, Wi-Fi wireless communication response signals, ZigBee wireless communication response signals, WiMAX wireless communication response signals, and the like.

With reference again to block 404 of the method 400, if it is determined that at least one LF response signal is received by the portable device 106, the method 400 may proceed to block 412, wherein the method 400 may include sending at least one LF response signal from the portable device 106 to the vehicle 102. In one embodiment, upon receipt of the LF polling signal(s) sent from the vehicle 102 (at block 402), the transceiver 122 may communicate respective data to the response signal module 204. The response signal module 204 may be configured to thereafter communicate one or more commands to the transceiver 122 of the portable device 106 to send the one or more LF response signals back to the vehicle 102. The one or more LF response signals may be sent back to the vehicle 102 to indicate to the application 104 and the vehicle 102 that the portable device 106 is within the predetermined vicinity of the vehicle 102. The method 400 may proceed to block 414, wherein the method 400 may include determining if at least one LF response signal is received by the vehicle 102. In an exemplary embodiment, upon sending of each of the one or more LF response signals from the portable device 106 to the vehicle 102, the response signal module 204 may communicate respective data to the wireless signal module 202 that indicates the sending of the respective LF response signal. Upon receiving indication of the sending of each LF response signal from the response signal module 204, the wireless signal module 202 may be configured to communicate with the communication control unit 112 to determine if one or more of the transceivers 116a-116h has received one or more of the LF response signals sent from the transceiver 122 of the portable device 106.

If the portable device 106 is within the predetermined proximity of the vehicle 102 and the vehicle 102 receives one or more of the LF response signals sent from the portable device 106, the communication control unit 112 may communicate respective data to the wireless signal module 202. This may indicate that electrical noise has not precluded LF communication between the portable device 106 and the vehicle 102. Alternatively, if the communication control unit 112 does not receive one or more of the LF response signals, the communication control unit 112 may communicate respective data to the wireless signal module 202. This may indicate that the location of the portable device 106 with respect to the vehicle 102 and/or electrical noise caused by one or more of the mobile devices 108 that may be precluding the LF communication between the vehicle 102 and the portable device 106.

If it is determined that at least one LF response signal is not received by the vehicle 102 (at block 414) or if it is determined that at least one interfering device is not located within the predetermined proximity of the vehicle 102 (at block 406), the method 400 may proceed to block 416, wherein the method 400 may include sending a wireless communication response signal to the vehicle 102 from the portable device 106. In an exemplary embodiment, if the response signal module 204 determines that the one or more of the LF response signals has not been received by the communication control unit 112 of the vehicle 102 or the interfering device determinant module 206 determines that at least one interfering device is not located within the predetermined proximity of the vehicle 102, the response signal module 204 may communicate commands to the transceiver 122 of the portable device 106 to send one or more wireless communication response signals from the portable device 106 to the communication control unit 112 of the vehicle 102 through the transceivers 116a-116h.

In particular, the response signal module 204 may send commands to the transceiver 122 to send the one or more wireless communication response signals in one or more wireless communication frequencies and/or formats based on the potential existence of electrical noise. In one configuration, upon receiving the commands, the transceiver 122 may send one or more number of wireless communication response signals from the portable device 106 to the entirety of the predetermined proximity of the vehicle 102. The transceivers 122 may send the one or more wireless communication response signals as wireless communication signals that may include, but may not be limited to, Bluetooth® wireless communication response signals, Wi-Fi wireless communication response signals, ZigBee wireless communication response signals, WiMAX wireless communication response signals, and the like.

Upon sending the wireless communication response signal to the vehicle 102 from the portable device 106 (at block 416) or from the interfering device(s) (at block 410), or upon determining that at least one LF response signal is received by the vehicle 102 (at block 414), the method 400 may proceed to block 418. At block 418, the method 400 may include communicating data to the vehicle system(s) 118. In one configuration, the response signals sent by the portable device 106 may include the device identification code that specifically corresponds to the portable device 106 that may be used as an identification mechanism by the vehicle 102. Alternatively, the response signals sent by the mobile device(s) 108 may include the device identification code that specifically corresponds to a respective mobile device(s) 108 that may be used as an identification mechanism by the vehicle 102.

In one embodiment, upon receiving the LF response signal, the ECU 110 may evaluate the device identification code to determine that the portable device 106 or the mobile device(s) 108 (that is associated with the vehicle 102) is located within the predetermined proximity of the vehicle 102. In one or more embodiments, upon determining that the portable device 106 or the mobile device(s) 108 is located within the predetermined proximity of the vehicle 102, the ECU 110 may communicate respective data and one or more commands to one or more of the vehicle systems 118 to enable or disable one or more functions. In other words, one or more of the vehicle systems 118 may be operably controlled to enable or disable one or more functions based on the determination that the portable device 106 is located within the predetermined proximity of the vehicle 102 as the user holding the portable device 106 or the mobile device(s) 108 is walking towards the vehicle 102 or walking away from the vehicle 102.

Figure 5:
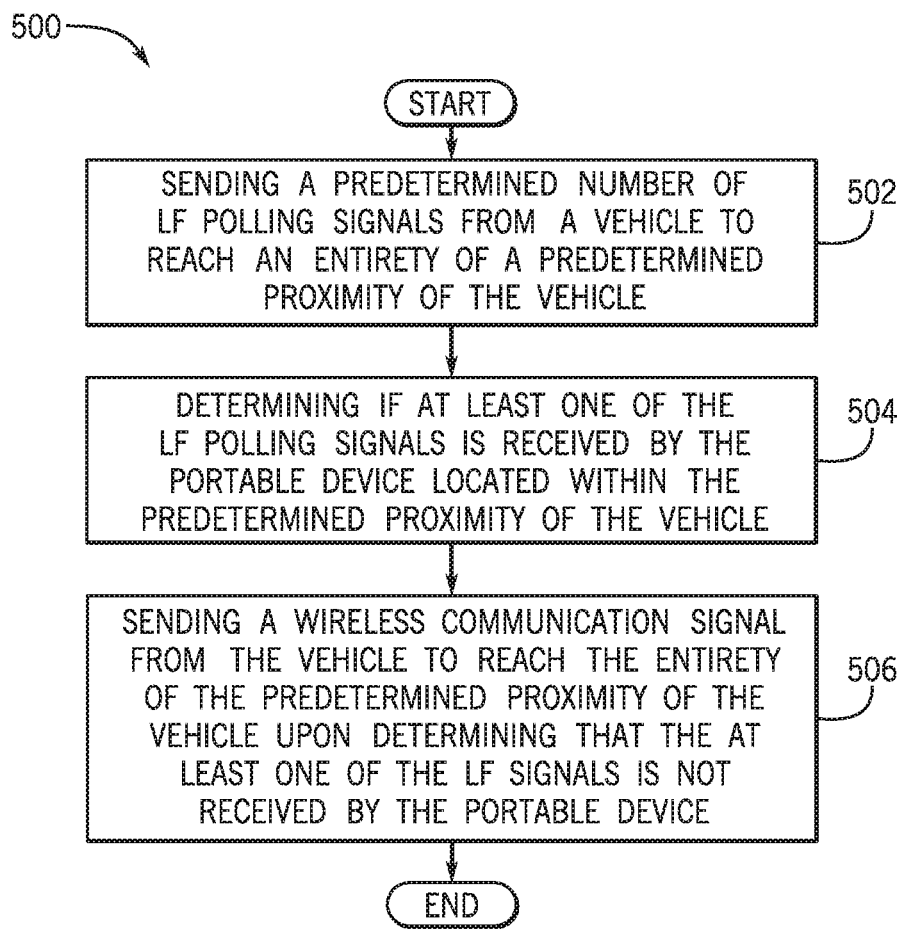
FIG. 5 is a process flow diagram of a method for communicating with a portable device in an electrically noisy environment according to an exemplary embodiment of the present disclosure.

FIG. 5 is a process flow diagram of a method 500 for communicating with a portable device 106 in an electrically noisy environment according to an exemplary embodiment of the present disclosure. FIG. 5 will be described with reference to the components of FIG. 1 and FIG. 2 though it is to be appreciated that the method of FIG. 5 may be used with other systems and/or components. The method 500 may begin at block 502, wherein the method 500 may include sending a predetermined number of LF polling signals from a vehicle 102 to reach an entirety of a predetermined proximity of the vehicle 102.

The method 500 may proceed to block 504, wherein the method 500 may include determining if at least one of the LF polling signals is received by the portable device 106 located within the predetermined proximity of the vehicle 102. The method 500 may proceed to block 506, wherein the method 500 may include sending a wireless communication signal from the vehicle 102 to reach the entirety of the predetermined proximity of the vehicle 102 upon determining that the at least one of the LF polling signals is not received by the portable device 106.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for communicating with a portable device in an electrically noisy environment comprising:
   sending a predetermined number of LF polling signals from a vehicle to reach an entirety of a predetermined proximity of the vehicle;
   determining if at least one of the LF polling signals is received by the portable device located within the predetermined proximity of the vehicle; and
   sending a wireless communication signal from the vehicle in at least one wireless communication protocol that is a different frequency and format than the predetermined number of LF polling signals to reach the entirety of the predetermined proximity of the vehicle upon determining the at least one of the LF polling signals is not received by the portable device.

2. The computer-implemented method of claim 1, wherein determining if at least one of the LF polling signals is received includes communicating with a transceiver of the portable device to determine if the transceiver has received at least one of the LF polling signals.

3. The computer-implemented method of claim 2, wherein determining if the at least one of the LF polling signals is received includes communicating with the transceiver of the portable device to determine that the transceiver has received the at least one of the LF polling signals when the location of the portable device is within the predetermined proximity of the vehicle.

4. The computer-implemented method of claim 1, wherein sending the wireless communication signal from the vehicle includes determining an existence of electrical noise based on determining that at least one of the LF polling signals is not received by the portable device and sending the wireless communication signal in the at least one wireless communication protocol that is the different frequency and format than the predetermined number of LF polling signals.

5. The computer-implemented method of claim 1, further including adding at least one device identification code that is associated with at least one mobile device to an interfering device list within a storage unit of the vehicle as at least one potential interfering device.

6. The computer-implemented method of claim 5, further including determining if the at least one interfering device is located within the predetermined vicinity of the vehicle based on comparing at least one device identification code received by the at least one interfering device to the at least one device identification code included within the interfering device list.

7. The computer-implemented method of claim 6, wherein sending the wireless communication signal includes sending the wireless communication signal from the vehicle directly to the at least one interfering device that is located within the predetermined vicinity of the vehicle.

8. The computer-implemented method of claim 1, further including sending at least one LF response signal from the portable device to the vehicle upon determining that at least one of the LF polling signals is received by the portable device, wherein it is further determined if the at least one LF response signal is received by the vehicle.

9. The computer-implemented method of claim 8, further including sending a wireless communication response signal to the vehicle from the portable device when it is determined that the least one LF response signal is not received by the vehicle, wherein the wireless communication response signal is sent in at least one wireless communication protocol that is a different frequency and format than the at least one LF response signal.

10. A system for communicating with a portable device in an electrically noisy environment comprising:
- a memory storing instructions when executed by a processor cause the processor to:
- send a predetermined number of LF polling signals from a vehicle to reach an entirety of a predetermined proximity of the vehicle;
- determine if at least one of the LF polling signals is received by the portable device located within the predetermined proximity of the vehicle; and
- send a wireless communication signal from the vehicle in at least one wireless communication protocol that is a different frequency and format than the predetermined number of LF polling signals to reach the entirety of the predetermined proximity of the vehicle upon determining that the at least one of the LF polling signals is not received by the portable device.

11. The system of claim 10, wherein determining if at least one of the LF polling signals is received includes communicating with a transceiver of the portable device to determine if the transceiver has received at least one of the LF polling signals.

12. The system of claim 11, wherein determining if the at least one of the LF polling signals is received includes communicating with the transceiver of the portable device to determine that the transceiver has received the at least one of the LF polling signals when the location of the portable device is within the predetermined proximity of the vehicle.

13. The system of claim 10, wherein sending the wireless communication signal from the vehicle includes determining an existence of electrical noise based on determining that at least one of the LF polling signals is not received by the portable device and sending the wireless communication signal in the at least one wireless communication protocol that is the different frequency and format than the predetermined number of LF polling signals.

14. The system of claim 10, further including adding at least one device identification code that is associated with at least one mobile device to an interfering device list within a storage unit of the vehicle as at least one potential interfering device.

15. The system of claim 14, further including determining if the at least one interfering device is located within the predetermined vicinity of the vehicle based on comparing at least one device identification code received by the at least one interfering device to the at least one device identification code included within the interfering device list.

16. The system of claim 15, wherein sending the wireless communication signal includes sending the wireless communication signal from the vehicle directly to the at least one interfering device that is located within the predetermined vicinity of the vehicle.

17. The system of claim 10, further including sending at least one LF response signal from the portable device to the vehicle upon determining that at least one of the LF polling signals is received by the portable device, wherein it is further determined if the at least one LF response signal is received by the vehicle.

18. The system of claim 17, further including sending a wireless communication response signal to the vehicle from the portable device when it is determined that the least one LF response signal is not received by the vehicle, wherein the wireless communication response signal is sent in at least one wireless communication protocol that is a different frequency and format than the at least one LF response signal.

19. A non-transitory computer readable storage medium storing instructions that when executed by a computer, which includes a processor perform a method, the method comprising:
- sending a predetermined number of LF polling signals from a vehicle to reach an entirety of a predetermined proximity of the vehicle;
- determining if at least one of the LF polling signals is received by a portable device located within the predetermined proximity of the vehicle; and
- sending a wireless communication signal from the vehicle in at least one wireless communication protocol that is a different frequency and format than the predetermined number of LF polling signals to reach the entirety of the predetermined proximity of the vehicle upon determining that the at least one of the LF polling signals is not received by the portable device.

20. The non-transitory computer readable storage medium of claim 19, further including determining an existence of electrical noise based on determining that at least one of the LF polling signals is not received by the portable device and sending a wireless communication response signal to the vehicle from the portable device, wherein the wireless communication response signal is sent in the at least one wireless communication protocol that is the different frequency and format than a LF response signal.

* * * * *